US006934396B1

(12) United States Patent
Leapman

(10) Patent No.: US 6,934,396 B1
(45) Date of Patent: Aug. 23, 2005

(54) SPEAKER EMBEDDED WITH ORAL SETUP TUTORIAL

(75) Inventor: Scott D. Leapman, Sioux City, IA (US)

(73) Assignee: Gateway Inc., Irvine, CA (US)

(*) Notice: Subject to any disclaimer, the term of this patent is extended or adjusted under 35 U.S.C. 154(b) by 630 days.

(21) Appl. No.: 09/967,813

(22) Filed: Sep. 28, 2001

(51) Int. Cl.[7] ......................... H04R 29/00; G06F 17/00
(52) U.S. Cl. ............................. 381/59; 700/94; 381/58
(58) Field of Search .................... 381/59, 58; 345/978; 700/94

(56) References Cited

U.S. PATENT DOCUMENTS

| | | | | |
|---|---|---|---|---|
| 4,778,391 | A | 10/1988 | Weiner | 434/317 |
| 4,990,092 | A | 2/1991 | Cummings | 434/317 |
| 5,577,186 | A | 11/1996 | Mann, II et al. | 395/806 |
| 5,648,753 | A | 7/1997 | Martin | 340/324 |
| 5,687,334 | A | 11/1997 | Davis et al. | 395/339 |
| 5,705,992 | A | 1/1998 | Romano | 340/692 |
| 5,825,871 | A | 10/1998 | Mark | 379/355 |
| 5,903,266 | A * | 5/1999 | Berstis et al. | 345/708 |
| 5,949,887 | A | 9/1999 | Fado et al. | 381/58 |
| 5,999,213 | A | 12/1999 | Tsushima et al. | 348/180 |
| 6,091,413 | A | 7/2000 | Takeuchi et al. | 345/336 |
| 6,160,986 | A | 12/2000 | Gabai et al. | 434/308 |
| 6,359,987 | B1 * | 3/2002 | Tran et al. | 381/58 |
| 6,711,543 | B2 * | 3/2004 | Cameron | 704/270 |

* cited by examiner

*Primary Examiner*—Forester W. Isen
*Assistant Examiner*—Devona E. Faulk
(74) *Attorney, Agent, or Firm*—Leonard & Proehl; Jeffrey A. Proehl

(57) ABSTRACT

Oral instructions for setting up a system of speakers are provided in a setup speaker. The setup speaker audibly plays the instructions and is powered by a battery or external power source. Oral indications of successful connections and completion of the setup are provided. The language of the instructions is also selectable.

28 Claims, 3 Drawing Sheets

SPEAKER EMBEDDED WITH ORAL SETUP TUTORIAL

FIELD OF THE INVENTION

The present invention relates to setup of speakers, and in particular to an oral setup tutorial embedded in a speaker.

BACKGROUND OF THE INVENTION

Sound systems are becoming increasingly complex and difficult to properly set up. Some sound systems include many components such as multiple speakers and different types of speakers, such as woofers and sub-woofers, analog and digital, and multiple different types of connection cables. Many of the components are shipped in separate containers, and need to be properly connected together when set up by a user. Sound systems are used with televisions, computer systems, set top boxes, audio amplifiers and other entertainment environments. They are used by users who enjoy the sound they provide, but may have little knowledge of how they work, or how to set them up.

Some sound systems come with diagrams, showing how each component of the sound system should be connected. Many users are still incapable of following the diagrams, given the complexity of the setup. Even users who are very capable, may make mistakes. One computer system provides for audio setup instructions once the computer is plugged in. However, the user must still make at least one connection prior to receiving the audio instructions.

SUMMARY OF THE INVENTION

Audio instructions for setting up a system of speakers are provided in one of the speakers referred to as a setup speaker. The setup speaker audibly plays the instructions when one or more user controls is activated by a user setting up the speaker system. The speaker is powered by a battery, or alternatively when plugged into an external power source.

The audio instructions provide instructions regarding connection of the speakers to an audio source such as a computer system, audio amplifier, television, set top box or other entertainment system. In one embodiment, an audio indication of successful completion is provided, and the instructions are discontinued. In a further embodiment, audio feedback for connections is provided. The feedback includes, for example, statements identifying incorrect connections, requests to check the connections, and positive feedback for correct connections. Further examples include providing information about alternatives when connecting new speakers, such as different methods of connecting analog and digital speakers.

Connectors in one embodiment, include cable specific switches that either generate a signal back to the speaker, or complete a circuit through the cable when properly connected. In other embodiments, the setup speaker pings or otherwise signals the other speakers to obtain a self identifying signal. In still further embodiments, speakers include a wireless transmitter/transceiver that sends a signal to the setup speaker when a proper connection is detected. Logic in the setup speaker determines whether the identified speaker is correctly set up.

In yet a further embodiment, setup instructions are provided in multiple languages, with the language either selected during an order process, or during the setup process.

DETAILED DESCRIPTION OF THE INVENTION

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
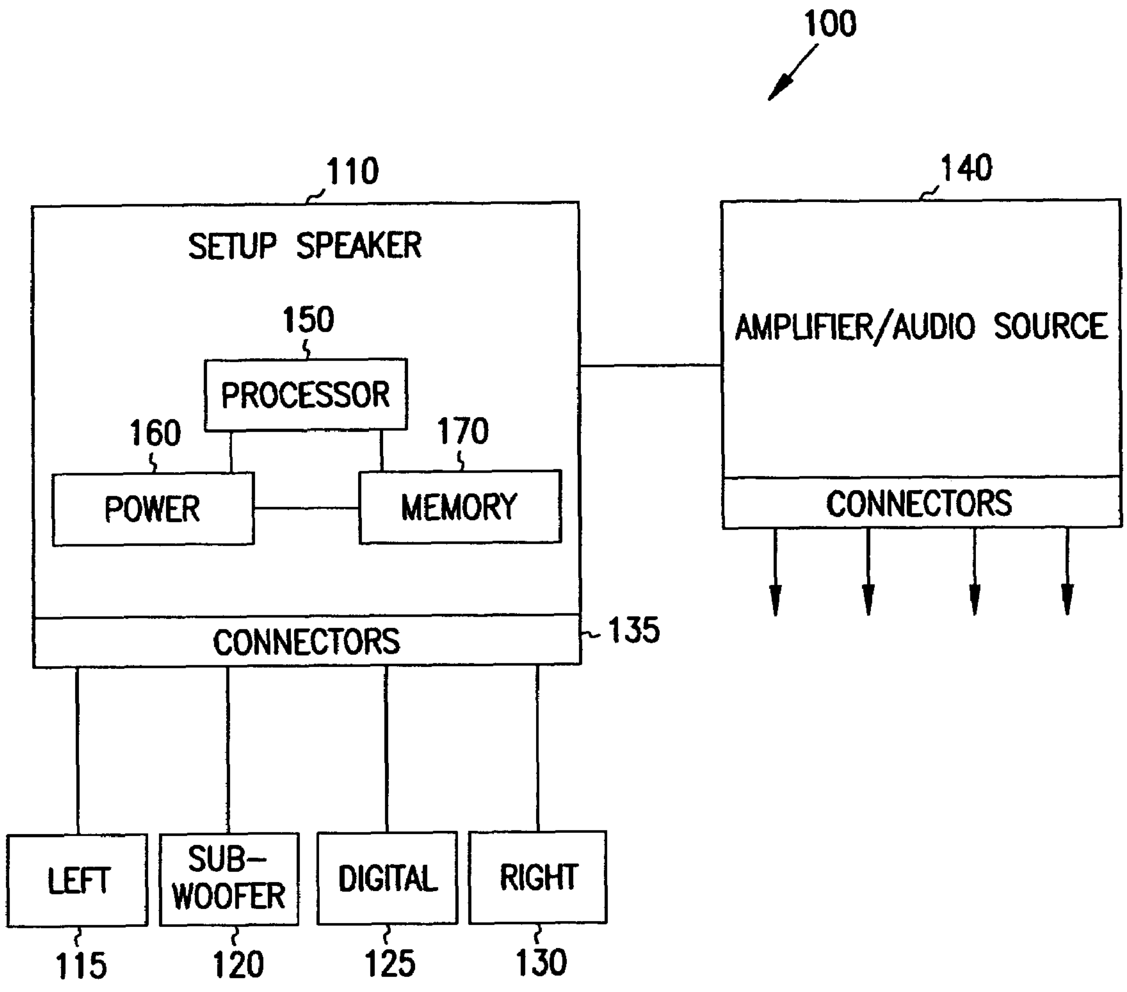
FIG. 1 is a block representation of a speaker system having a setup speaker that provides audio instructions for setup of the speaker system.

A speaker system to be setup is shown generally at 100 in FIG. 1. A setup speaker 110 is coupled to a plurality of other speakers when properly set up. Such other speakers are for example a left speaker 115, a sub woofer 120, digital speaker 125, right speaker 130 and various other speakers such as various surround sound speakers. In one embodiment, the setup speaker is a right speaker or sub-woofer.

The speakers are coupled to the setup speaker via a number of cables coupled to connectors 135. Such cables correspond to channels of the speaker. Each speaker is also equipped with a connector for other ends of the cables. An amplifier 140 that drives the speakers is coupled to the setup or main speaker 110 and optionally directly to the other speakers. The amplifier comprises a computer system, a stereo amplifier/receiver, set top box, or other source of audio for playing on the speakers.

Setup speaker 110 comprises a processor 150, power source 160 such as a rechargeable battery or connector for connection to an external source, and a memory 170. Processor 150 is activated by connecting power, or selecting a switch on the speaker, such as by turning it on, or using any other control on the speaker. Processor 150 then retrieves oral setup instructions from non-volatile memory 170, and plays audio of the instructions to a user to aid in making connections to other speakers and other components, such as amplifier 140. The oral instructions are played over a main speaker of the setup speaker, or an embedded speaker on an electronic chip, which in one embodiment additionally contains the processor and memory. Memory 170 contains sequential instructions regarding proper connections to be made in setting up the speaker system. It also contains trouble shooting statements that indicate when something is incorrectly connected, and sometimes hints as to alternative ways to connect speakers. In one embodiment, the oral instructions describe labels, shapes and/or colors of connectors and cables and ends of cables to insert into the connectors. The instructions are tailored to the system of speakers ordered by the user.

Figure 2:
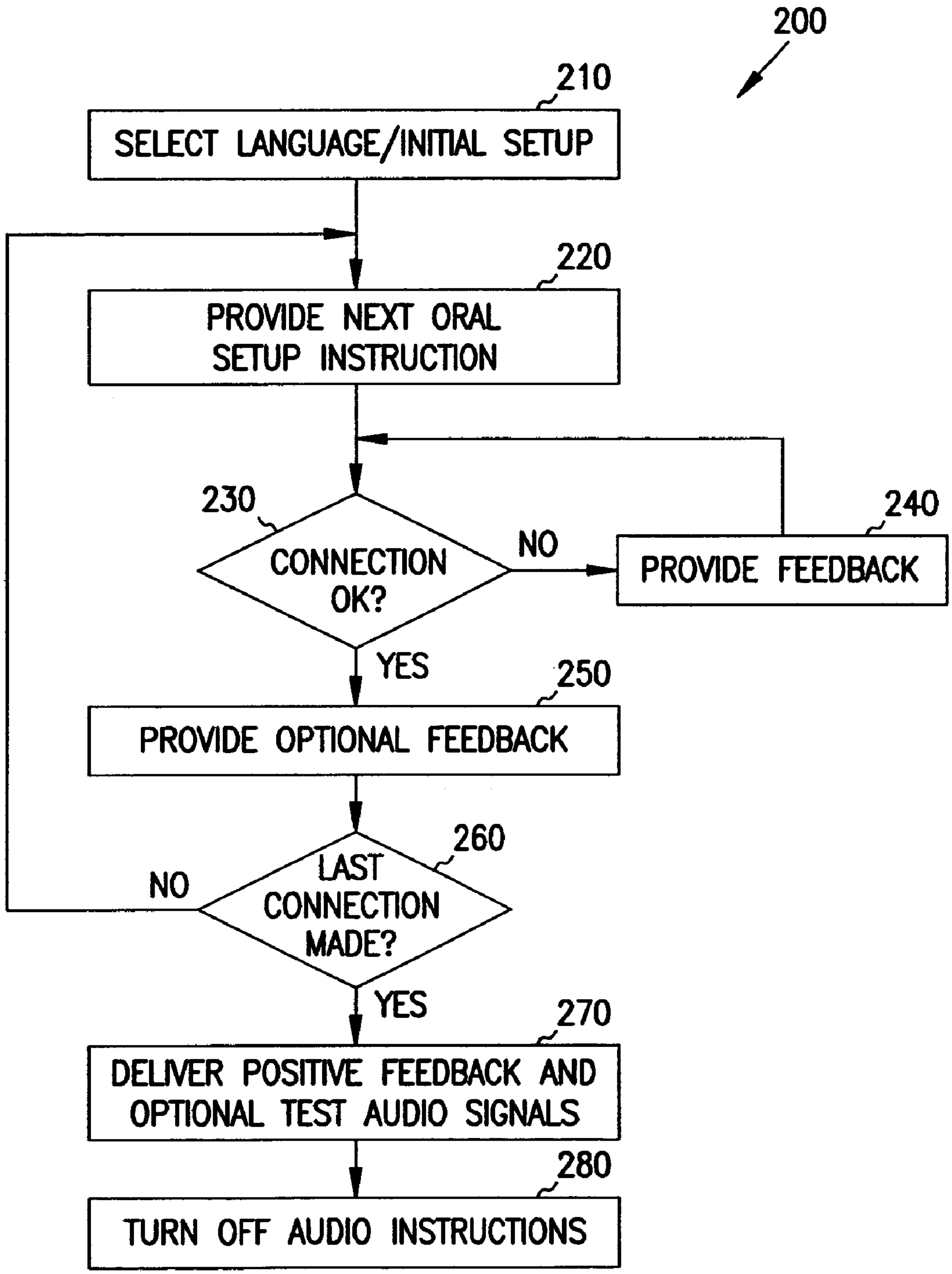
FIG. 2 is a flowchart showing a process of providing audio instructions for setup of the speaker system of FIG. 1.

A process implemented or executed on processor 150 is described with respect to flowchart 200 of FIG. 2. The speaker system is usually shipped in multiple containers, and includes multiple cables to connect the speakers. It can be a very complex task without specific knowledge of how to connect them. The setup speaker 110 is identified in instructions as the first speaker to set up. The user initiates setup by turning on the setup speaker, using any of the controls associated with the setup speaker, or plugging the setup speaker into an external power source. In one embodiment, an external switch or response to instructions to select a language for the oral instructions causes the instructions to be audibly provided in the language selected, or a default language is selected, such as English, or other language selected prior to shipment. In one embodiment, voice recognition circuitry is used to initiate the setup audio, and to select the language in response to oral user commands.

Once initiated, the setup instructions are provided starting at 220. In one embodiment, a sequence of instructions is repeated until successful completion of all connections is detected by the system. At that time, the user is orally informed of the successful completion as by means of an audible phrase such as: "Congratulations, you have successfully completed set up of the speaker system." A test is alternatively conducted, using audio directed to individual speakers identifying the speaker, so the user can check whether the system is properly installed.

In the embodiment of FIG. 2, each setup instruction is provided individually at 220. The setup speaker then checks to determine if the connection corresponding to the instruction was properly made at 230 following a suitable timeout or user providing indication that they think the connection has been made. If the connection is not properly made, feedback is provided at 240 indicating that the connection was not properly made. Such messages in one embodiment include: "A right speaker has been connected to the left channel", or "An analog channel has been connected to a digital connector", or "Please check the connection . . . " followed by a repeat of the instruction. If the connection is still not properly made, the next sequence of audio instructions at 240 alternatively informs the user to consult a poster illustrating the connections, and finally provides a telephone number to call for further assistance.

Once the connection is found to be properly made for a corresponding instruction, optional feedback is provided at 250 indicating that: "The connection has been properly made", or some other statement made identifying the components that have been properly connected. A check is then made at 260 regarding whether or not the last connection in the series of connections for setting up the system has been made. If not, the next instruction is played at 220. If it was the last connection, a positive audible statement is made providing feedback that the setup procedure was properly followed at 270. Optionally, an audio test is provided, with sounds sequentially played from each speaker in the speaker network. In one embodiment, an oral statement is provided at each speaker indicating its identity, such as: "This is your left speaker." The audio instructions are then turned off at 280.

Figure 3:
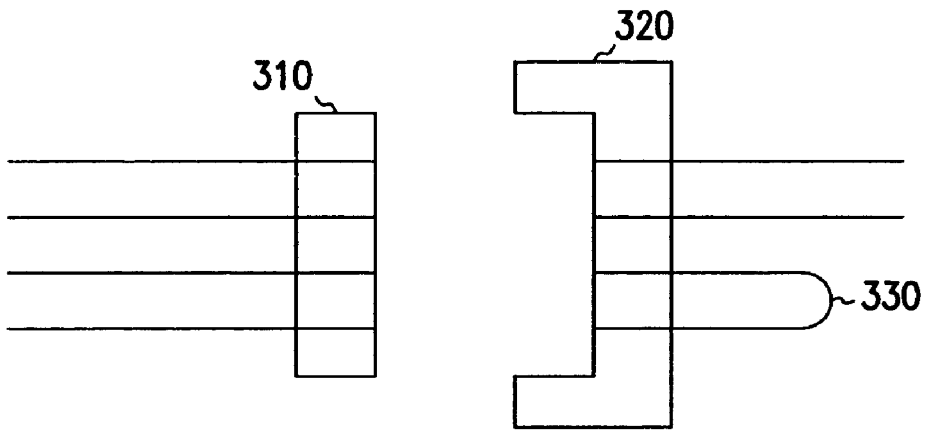
FIG. 3 is a schematic representation of a pair of connectors that provide an indication of proper connection of a speaker.

A connector for connecting cables to components is shown in FIG. 3. A male connector 310 is formed to mate with a female connector 320. The male connector in this embodiment is at the end of a cable from the setup speaker, and contains four conductors. The female connector 320 comprises a pair of conductors 330 that are shorted to each other. The setup speaker is able to use the conductors 330 to determine when the cable is properly conducted. In one embodiment, a cable contains many conductors, and two or more conductors are shorted in a manner that uniquely identifies the proper component.

Figure 4:
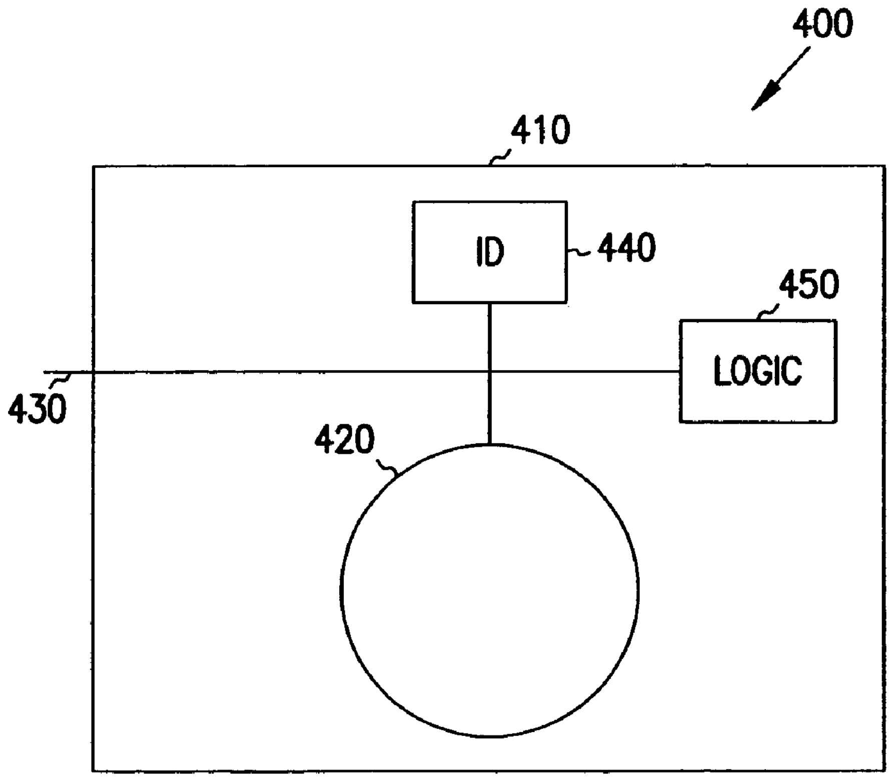
FIG. 4 is block diagram of a speaker to be connected to the network of speakers.

In FIG. 4, a component to be connected to the setup speaker is shown in block form at 400. A cabinet, such as a speaker cabinet 410 is provided with a speaker 420 coupled to a cable 430 which is coupled to the setup speaker or other audio source. A memory 440 containing an identification of the device, such as a left speaker or right speaker is coupled to logic 450. The memory 440 is either directly read from the setup speaker upon connection to determine if the connection is proper, or the logic determines that a connection has been made and sends the ID to the setup speaker. In a further embodiment, the setup speaker indicates the type of speaker it should be coupled to on that channel, and the logic 450 compares that to the ID. In still a further embodiment, logic 450 comprises an RF chip or other chip capable of wireless communication such as Bluetooth transmitter or electromagnetic pulse transmitter that broadcasts the ID in response to a request from the setup speaker, or upon detection of a connection. These signals are used by the setup speaker to identify that the speaker is properly connected.

The functions described herein are implemented in software in one embodiment, where the software comprises computer executable instructions stored on computer readable media such as memory 170 or other type of storage devices. The term "computer readable media" is also used to represent carrier waves on which the software is transmitted.

CONCLUSION

A setup speaker provides audible oral setup instructions for setting up a system of speakers. The setup speaker is self powered, and the instructions are provided prior to any connections being made. Feedback regarding proper and improper connections are made, as well as an announcement that the setup process has been successfully completed. In further embodiments, instructions for setting up other devices in the system are provided.

The term, "oral", as used herein and as contemplated with respect to the invention means any audio signal or sound that conveys information to a user. Oral information includes for example, a prerecorded, sampled, or synthesized sound such as a spoke phrase or passage, a tone, voice or other instrument, electronically recorded or otherwise stored in an information storage medium as reproducible information, without being limited to any type of sound or signal, and also includes other various sounds without departing from the scope of the invention and without providing substantial change thereto.

What is claimed is:

1. A setup speaker comprising:

a processor;

a memory coupled to the processor, wherein the memory contains oral instructions for setting up a plurality of other speakers;

the processor detecting connections; and a battery that provides power to the setup speaker for playing the audio instructions prior to any connection.

2. The setup speaker of claim 1 wherein the speaker provides an oral indication each time a connection is made.

3. The setup speaker of claim 2 wherein the speaker provides an oral indication that the connection is proper when properly connected.

4. The setup speaker of claim 2 wherein the speaker provides an oral indication of an improper connection.

5. The setup speaker of claim 2 wherein the speaker provides further oral instructions when a proper connection is not detected.

6. The setup speaker of claim 1 and further comprising an amplifier that provides audio signals.

7. The setup speaker of claim 1 and further comprising a computer system that provides audio signals.

8. A setup speaker comprising:

a programmed processor;

a memory coupled to the processor, wherein the memory contains oral instructions for setting up a plurality of other speakers;

means for detecting if proper connections have been made to at least one of the other speakers; and wherein the processor provides an oral indication when proper connections have been made.

9. A setup speaker system comprising:

a setup speaker;

a processor;

a memory coupled to the processor, wherein the memory contains oral instructions for setting up a plurality of other speakers;

means for automatically detecting if connections have been made to at least one of the other speakers; and a battery that provides power to the setup speaker for playing the oral instructions describing a connection to be made during set up.

10. A method of providing audio instructions via a setup speaker, the method comprising:

receiving an indication from a user to begin providing oral instructions;

providing a next oral instruction;

detecting proper connection;

repeating the provision of a next oral instruction and detection of a proper connection until all connections are made; and providing an oral indication of successful completion of the set up.

11. The method of claim 10 and further comprising providing an oral indication each time a proper connection is made.

12. The method of claim 11 and further comprising detecting improper connections.

13. The method of claim 12 and further comprising providing an oral indication regarding an improper connection.

14. The method of claim 13 wherein the oral indication of improper connection comprises information regarding how the connection is improper.

15. The method of claim 13 wherein the oral indication of improper connection comprises a repeat of the corresponding oral instruction with further information than originally provided in the oral indication of the corresponding instruction.

16. The method of claim 13 wherein the indication from a user to begin providing oral instructions includes a language selection indication.

17. A method of providing audio instructions via a setup speaker, the method comprising:

receiving an indication from a user to begin providing oral instructions:

providing a next oral instruction:

detecting proper connection;

repeating the provision of a next oral instruction and detection of a proper connection until all connections are made:

providing an oral indication of successful completion of the setup;

providing an oral indication each time a proper connection is made;

detecting improper connections;

providing an oral indication regarding an improper connection; and wherein a proper connection is detected by requesting an ID from the newly connected speaker, and comparing the ID to an expected ID.

18. A computer readable medium having instructions for causing a processor to perform a method of providing oral instructions via a setup speaker, the method comprising:

receiving an indication from a user to begin providing oral instructions;

providing a next instruction;

detecting proper connection;

repeating the provision of a next instruction and detection of a proper connection until all connections are made; and providing an oral indication of successful completion of the setup.

19. A method of providing oral instructions to set up a system of speakers via a setup speaker, the method comprising:

a) receiving an indication from a user to begin providing oral instructions;

b) providing a next instruction;

c) detecting a connection;

d) providing feedback regarding the connection;

e) determining if more connections need to be made to properly set up the system of speakers;

f) if another connection needs to be made, repeating b, c, d and e;

g) provide positive feedback regarding successful completion of setup.

20. The method of claim 19 and further comprising:

h) providing audible test signals through the speakers in the system of speakers.

21. The method of claim 19 wherein the feedback, d, comprises positive feedback regarding a proper connection, and additional instructions regarding an improper connection.

22. The method of claim 21 wherein detection of an improper connection, c, results in waiting for a new connection to be made in response to the additional instructions.

23. The method of claim 21 wherein the additional instructions include information regarding why the connection was improper.

24. The setup speaker of claim 1 wherein the processor detects connections automatically without user intervention.

25. The setup speaker of claim 1 wherein the processor detects the presence or absence of connections.

26. The setup speaker of claim 1 wherein the battery is configured to provide power prior to making any connection to the setup speaker.

27. The setup speaker of claim 1 wherein the memory comprises a memory chip.

28. The setup speaker system of claim 9 additionally comprising an enclosure, the speaker, the processor, the memory, and the battery being positioned within the enclosure such that the setup speaker is capable of playing the oral instructions without making any external connections to the enclosure.

* * * * *